Patented May 20, 1941

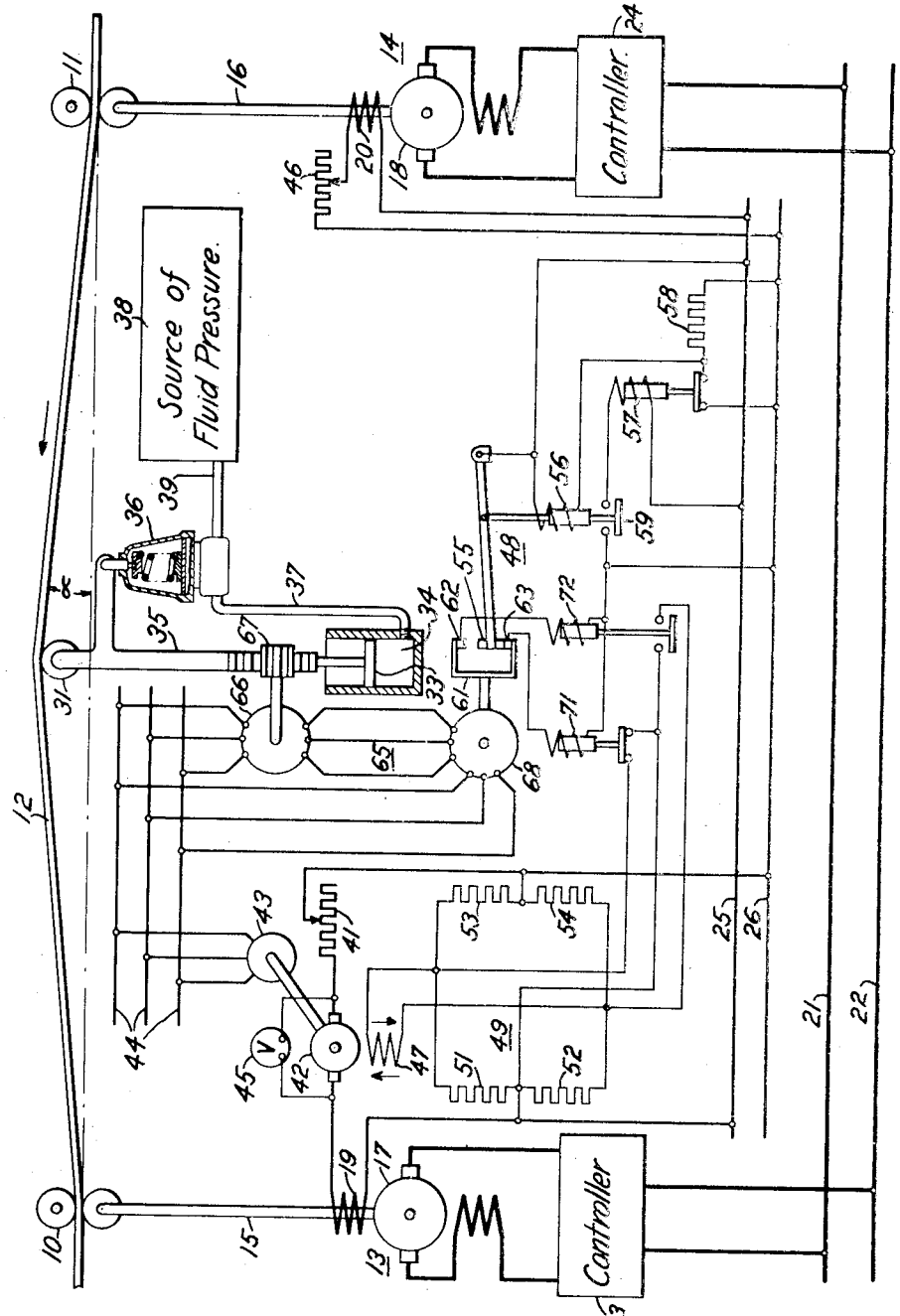

2,242,346

UNITED STATES PATENT OFFICE 2,242,346

TENSION CONTROL FOR ROLLING MILLS

Willard G. Cook, Wilkinsburg, Pa., assignor to Westinghouse Electric & Manufacturing Company, East Pittsburgh, Pa., a corporation of Pennsylvania Application September 23, 1937, Serial No. 165,287

13 Claims. (Cl. 80—35)

My invention relates, generally, to tension control systems and, more particularly, to systems for regulating the speed of the motors which drive the roll stands of a tandem mill in order to control the tension on the material being worked upon by the rollers.

Numerous methods have been proposed and utilized for maintaining a constant tension on the material extending between the rolls of a tandem mill. One method is to subject the material to a tension by means of an idler roller mechanism disposed to apply a force transverse to the path of movement of the material which varies in accordance with the degree of deflection of the material between predetermined limits of movement. Some of the tension control systems are provided with means for compensating for variations in the degree of deflection of the material from its normal path of travel and they operate satisfactorily over a fairly wide range of deflection. However, better results will be obtained if provision is made for maintaining the tension roller in as near a predetermined operating position as possible.

An object of the present invention is to provide for regulating the speed of one of the roll stand motors of a tandem mill in accordance with the vertical movements of the tension roller.

A more specific object of the invention is to provide a regulating system for the roll stand motors of a tandem mill which will operate over a wide range in speed.

Another object of the invention is to provide a combined manual and automatic regulating system for controlling the speed of the roll stand motors of a tandem rolling mill.

Other objects of the invention will be described fully hereinafter or will be apparent to those skilled in the art.

In accordance with one embodiment of the invention, the material which is passing through the rolls of a tandem mill is subjected to a transverse force at a point between the roll stands by means of an idler roller which is actuated by a force which is so regulated that the pressure on the material varies as the position of the idler roller changes. In order to keep the position of the idler roller within predetermined limits, provision is made for controlling the speed of at least one of the roll stand motors, the speed regulation being effected by means of a manually operated rheostat and a booster generator connected in the field circuit for one of the roll stand motors. The voltage of the booster is automatically controlled by a regulator through a Wheatstone bridge connection in accordance with the vertical movements of the idler roller, thereby permitting the roll stand motors to operate over a wide range in speed.

For a fuller understanding of the nature and objects of the invention, reference may be had to the following detail description taken in conjunction with the accompanying drawing, in which the single figure is a diagrammatic view of a control system embodying the invention.

Referring now to the drawing, the portion of a rolling mill which is illustrated therein comprises roll stands 10 and 11 through which a strip of material 12, such as sheet steel, is passed. The roll stands 10 and 11 may be driven in any suitable manner as by means of motors 13 and 14, respectively, which are connected to their respective roll members through shafts 15 and 16.

The driving motors 13 and 14 are provided with armature windings 17 and 18 and separately excited field windings 19 and 20, respectively. The armature windings may be energized from any suitable source of direct current power (not shown) through conductors 21 and 22, the motors 13 and 14 being connected thereto by controllers 23 and 24, respectively. The field windings 19 and 20 are energized from power conductors 25 and 26, as will be explained more fully hereinafter.

In order to provide for maintaining a predetermined tension on the material 12, there is utilized a tensioning device for exerting a transverse deflecting force on the material between the roll stands 10 and 11. If a deflecting force is applied to the material 12 midway between the two stands so as to move it from the plane of the straight pass line extending between the roll stands to a deflected position, the tension on the material will be a function of the sine of the angle of deflection, alpha, and the tension will remain substantially constant so long as the strip is maintained in this position under a constant force.

However, if the length of the material between roll stands increases and the same constant deflecting force is applied, the angle of deflection becomes greater and, therefore, the tension on the material is reduced. The opposite is true in the event that the length of the material between the roll stands decreases, thereby causing the tension on the material to increase.

In view of the foregoing, it will be understood that in order to maintain a predetermined tension on the material, provision must be made for not only maintaining the tensioning means which applies the force to the material as nearly as possible in a certain position, but provision must also be made for causing a variation to occur in the amount of force produced by the deflecting means, depending upon the degree of deflection of the material from its normal path of travel. In general, the pressure characteristic must be such that the pressure increases with increasing height of the material above the pass line.

In the present case, this result is accomplished by utilizing a tensioning device which is of the type fully described in the copending application of Gerhard P. Lessmann, Serial No. 133,418, filed March 27, 1937, now Patent No. 2,221,592 issued Nov. 12, 1940. However, it will be understood that a tensioning device of any other suitable type may be utilized. The tensioning device herein illustrated comprises an idler or tension roller 31, disposed to move up and down vertically beneath the material 12. The roller 31 may be raised by a fluid-pressure operated piston 33 disposed in a cylinder 34. The piston 33 is connected to the roller 31 by means of a cross head 35. In order to maintain a predetermined tension for various positions of the roll 31, the pressure in the cylinder 34 is so regulated that the pressure increases as the roll is raised. It will be understood that the weight of the idler roller 31 and cross head 35 may be counterbalanced by suitable weights or springs or other well known devices (not shown).

The foregoing regulation may be accomplished by utilizing a pressure regulating valve, shown generally at 36, to so vary the pressure ratio from inlet to outlet that with a constant inlet pressure a varying outlet pressure may be obtained. The pressure regulating valve 36 may be of a standard type which can be purchased on the open market. The outlet of the regulating valve 36 is connected to the cylinder 34 by means of a pipe 37 and the inlet of the valve may be connected to an air pressure tank 38 by means of a pipe 39. If desired, other suitable working mediums such as any other gas or liquid, may be utilized in place of air for operating the piston 33.

As described in the aforementioned copending application, the outlet pressure may be regulated in accordance with the position of the roller 31 by so connecting an adjusting spring provided in the valve 36 to the cross head 35 that the vertical movement of the roller 31 is transmitted to the adjusting spring of the regulating valve 36. In this manner, a constant tension may be maintained on the material 12 for various positions of the roller 31 by so regulating the pressure on the piston 33 that the pressure increases as the roller 31 is raised, and vice versa.

As explained hereinbefore, the pressure regulator 36 and the idler tension roller 31 will maintain a predetermined tension on the material 12 over a certain range of operation. However, more satisfactory results will be obtained if provision is made for maintaining the idler roller 31 in as near a predetermined operating position as possible. This may be accomplished by so controlling the relative speeds of the driving motors 13 and 14 that the length of the material 12 between the roll stands 10 and 11 does not vary. Should the deflection of the material vary from a value considered as normal, the speed of at least one of the motors is varied in accordance with the vertical movements of the tension roller 31 in a manner to take up the excess length in the strip of material or to increase its length, as the case may be.

However, in certain applications where the driving motors are required to operate over a wide speed range, it is difficult to apply a regulator to control the motor speed without encountering excessive hunting, which is not permissible in applications of this kind. In order to overcome this difficulty, I utilize both manual and regulator control for controlling the speed of one of the driving motors 13 in order that the regulator will be required to control the motor speed over a comparatively narrow speed range. In this manner the coarse adjustment of the speed is obtained by the operator by means of a manually adjusted rheostat 41 which cooperates with a booster generator 42, controlled by a regulator as explained hereinafter, to vary the excitation current in the field winding 19 of the motor 13, thereby controlling the speed of the motor 13. The booster generator 42 may be driven by a motor 43 which is energized from a suitable source of alternating current power through power conductors 44.

In order that the operator may determine when he has properly adjusted the rheostat 41 to regulate the speed of the motor 13 within the range of operation of the regulator, a damped volt meter 45 is connected across the armature of the booster generator 42. Thus, the rheostat 41 may be utilized to so adjust the excitation of the motor 13 that no voltage is developed by the booster 42, when the idler roller 31 is at the correct position. The current in the field winding 20 of the motor 14 may be adjusted by means of a manually operable rheostat 46 to adjust the speed of the motor 14 which drives the roll stand 11.

The voltage developed by the booster 42 and consequently the excitation of the field winding 19 of the motor 13 is controlled by governing the excitation of a field winding 47 on the booster generator 42. The excitation of the field winding 47 is controlled by a regulator 48 through a Wheatstone bridge circuit 49.

As shown, the Wheatstone bridge 49 comprises four resistors 51, 52, 53 and 54 connected in the usual manner to form a bridge circuit. The field winding 47 is connected across two terminals of the bridge 49 and the other two terminals of the bridge are connected across the power conductors 25 and 26.

While the regulator 48 has been illustrated as a vibrating type, it will be understood that a regulator of any suitable type may be utilized. A vibrating contact element 55 is operated in a well known manner by means of an electromagnet 56, and an auxiliary relay 57. When the power conductors 25 and 26 are energized, the electromagnet 56 is energized and raises the contact element 55 to its uppermost position. The energizing circuit for the electromagnet 56 contains a resistor 58 which is shunted by the auxiliary relay 57. Upon the operation of the electromagnet 56, its contact members 59 are closed to energize the auxiliary relay 57 which opens its contact members to insert the resistor 58 in the circuit for the electromagnet 56. This increases the resistance of the circuit for the electromagnet 56 to such an extent that the vibrating contact element 55 is returned to its lowermost position. This cycle of operation is again repeated, thereby causing the contact element 55 to vibrate.

The regulator 48 is provided with an adjustable contact element 61 having an upper contact member 62 and a lower contact member 63, which are positioned in accordance with the position of the tension roller 31. As shown, the contact members 62 and 63 are disposed to be engaged alternately by the vibrating contact member 55.

In order that the regulator 48 may be located at a position remote from the tension roller 31, provision is made for remotely transmitting the movement of the roller 31 to the regulator element 61 by means of an electrical device 65, commonly known as a "Synchro-tie," which is energized from the power conductors 44. As shown, the one member 66 of the "Synchro-tie" may be connected to the cross head 35 by means of a rack and pinion 67. The other member 68 may be so connected to the regulator element 61 that the vertical movement of the tension roller 31 is transmitted to the regulator element 61 in a manner well known in the art. In this way the position of the regulator element 61 is adjusted in accordance with the position of the tension roller 31.

In order to describe more clearly the functioning of the regulator 48 to control the excitation of the booster generator 42 and hence the speed of the motor 13 in accordance with the vertical movement of the roller 31, it will be assumed that the material 12 is traveling in the direction indicated by the arrow. Under this condition, the speed of the motor 13 must be increased when the deflection of the material 12 increases and decreased when the deflection decreases.

When the vibrating contact element 55 is in its lower position it engages the lower contact member 63 of the adjustable contact element 61 and a shunting switch 71 is energized to remove the shunt connection from the resistor 51 of the Wheatstone bridge 49, thereby varying the excitation of the booster 42 in such a manner as to decrease the excitation of the motor 13 and increase its speed accordingly.

When the contact element 55 is in its upper position, it engages the contact member 62 and a shunting switch 72 is energized to shunt the resistor 52 of the Wheatstone bridge 49, thereby changing the potential of the generator 42 to increase the excitation of the motor 13 which causes its speed to decrease.

It will be noted that the direction of flow of current through the field winding 47 of the generator 42 is changed by the operation of the shunting relays 71 and 72. Thus the voltage of the generator 42 is so controlled that it either aids or opposes the voltage of the power conductors 25 and 26, across which the field winding 19 is connected. In this manner, the generator 42 is utilized to govern the excitation of the field winding 19 of the motor 13.

The adjustable element 61 of the regulator 48 is so disposed that when the tension roller 31 is in its normal operating position, the vibrating contact element 55 makes contact with the upper and lower contacts of the adjustable contact element 61 for equal periods of time. If, however, the deflection of the material increases, the adjustable contact element 61 of the regulator 48 is so positioned that the vibrating element 55 engages the lower contact 63 for a greater time than it engages the upper contact 62, thereby causing the switch 71 to be maintained in its open position over longer periods of time than the switch 72 is closed which causes the speed of the roller 13 to increase a sufficient amount to reduce the deflection of the material 12 to normal.

The opposite is true when the deflection decreases below its normal value, thereby causing the shunting switch 72 to be maintained energized over longer periods of time than the switch 71. In this manner, the speed of the rolls 10 is decreased, and the deflection of the material 12 increased. As stated hereinbefore, when the tension roller 31 is in its normal operating position, the excitation of the generator 42 is so controlled by the regulator 48 that no voltage is developed by the booster generator, the motor field excitation being controlled by the setting of the manual rheostat 41.

In this manner, the position of the tension roller is maintained very closely to normal, since the regulator operates over a narrow speed range and, therefore, does not hunt excessively. Accordingly, the tension in the material 12 is more accurately controlled than would be otherwise possible.

From the foregoing description, it is apparent that I have provided a tension regulating system which will operate satisfactorily over a wide range of speed of the main driving motors of the system. Furthermore, the system may be utilized with tensiometer devices of various types which have been manufactured and installed heretofore to control the speed of the motors which drive the roll stands of a tandem mill.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a system for controlling the tension on a strip of material, in combination, a pair of roll stands for working the material, a motor for driving each of said roll stands, a booster generator for controlling the speed of one of said driving motors, and means only responsive to the tension on the strip for controlling the voltage of said booster generator.

2. In a system for controlling the tension on a strip of material, in combination, a pair of roll stands for working the material, a motor for driving each of said stands, said motors having separately excited field windings, a strip tensioning device, a booster generator having its armature winding connected in the separately excited field circuit of one of said motors, said booster generator having a separately excited field winding, and means responsive to the tensioning device for controlling the field current of the booster to thereby control the voltage of the booster, thereby controlling the speed of the driving motor.

3. In a system for controlling the tension on a strip of material, in combination, a pair of roll stands for working the material, means including a tensioning roller for subjecting the strip to a transverse force, a motor for driving each of said stands, said motors having separately excited field windings, a booster generator having its armature connected in the separately excited field circuit of one of said motors, said booster generator having a separately excited field winding, and means responsive to the movement of the tensioning roller for controlling the field exciting current of the booster generator to thereby control the voltage of the booster.

4. In a system for controlling the tension on a strip of material, in combination, a pair of roll stands for working the material, a motor for driving each of said roll stands, tensioning means disposed between said roll stands for subjecting the material to a transverse force, a booster generator for controlling the speed of one of said driving motors, and regulating means responsive to the operation of the tensioning means only for governing the voltage of the booster generator.

5. In a system for controlling the tension on a strip of material, in combination, a pair of roll stands for working the material, a motor for driving each of said roll stands, means including a tension roller disposed between said roll stands for applying a transverse pressure on said material, a booster generator for controlling the speed of one of said driving motors, manually operable means cooperating with the booster in controlling the motor speed, and regulating means responsive to the movement of the tension roller for governing the voltage of the booster.

6. In a system for controlling the tension on a strip of material, in combination, a pair of roll stands for working the material, a motor for driving each of said roll stands, a tension roller disposed between said roll stands, means for moving said roller to apply a transverse pressure on said material, a booster generator for controlling the speed of one of said driving motors, manually operable means cooperating with the booster in controlling the motor speed, said booster having a separately excited field winding, a Wheatstone bridge circuit, and means responsive to the movement of the tension roller for automatically regulating the field current of the booster through said Wheatstone bridge circuit to control the voltage of the booster.

7. In a system for controlling the tension on a strip of material, in combination, a pair of roll stands for working the material, a motor for driving each of said roll stands, a tension roller disposed between said roll stands, means for moving said roller to apply a transverse pressure on said material, a booster generator for controlling the speed of one of said driving motors, manually operable means cooperating with the booster in controlling the motor speed, regulating means responsive to the movement of the tension roller for governing the voltage of the booster, and means for remotely transmitting the movement of said tension roller to said regulating means.

8. In a system for controlling the tension on a strip of material, in combination, a pair of roll stands for working the material, a motor for driving each of said roll stands, a tension roller disposed between said roll stands, means for moving said roller to apply a transverse pressure on said material, a booster generator for controlling the speed of one of said driving motors, manually operable means cooperating with the booster in controlling the motor speed, regulating means responsive to the movement of the tension roller for governing the voltage of the booster, and electrically energized means for remotely transmitting the movement of said tension roller to said regulating means.

9. In a system for controlling the speed of an electric motor in accordance with the displacement from a predetermined normal position of a movable device disposed to have its displacement varied by speed variation of the motor, a booster generator connected in series circuit relation with the field winding of the electric motor, a continuously energized Wheatstone bridge, said booster generator having its field winding connected to be energized in accordance with the degree of unbalance of said bridge, and means responsive to the displacement of the movable device from said predetermined normal position for controlling the degree of unbalance of said bridge.

10. In a system for controlling the excitation of a dynamo-electric machine in accordance with the displacement from a predetermined position of a movable device whose displacement is controlled by the motor speed, a booster generator connected in series circuit relation with the field winding of the dynamo-electric machine, a continuously energized Wheatstone bridge, said booster generator having its field winding connected to be energized in accordance with the degree of unbalance of said bridge, and means responsive to the displacement of the movable device for controlling the degree of unbalance of said bridge.

11. In a system for controlling the excitation of a dynamo-electric machine in accordance with the displacement of a movable device whose displacement may be varied by variations in the excitation of the dynamo-electric machine, a booster generator connected to affect the excitation of the dynamo-electric machine, a continuously energized Wheatstone bridge, said booster generator having its field winding connected to be energized in accordance with the unbalance of said bridge, means for alternately unbalancing said bridge in such a manner as to alternately produce potentials of opposite polarity on said booster generator field winding, and means controlled by the displacement of the movable device for varying the relative lengths of the intervals of time that the opposite polarities are applied to said booster generator field winding.

12. In a system for controlling the excitation of a dynamo-electric machine in accordance with the displacement of a movable device whose displacement may be varied by variations in the excitation of the dynamo-electric machine, a booster generator connected to affect the excitation of the dynamo-electric machine, a continuously energized Wheatstone bridge, said booster generator having its field winding connected to be energized in accordance with the unbalance of said bridge, means for intermittently so varying certain of the resistances of said bridge as to alternately cause first one and then the other of two values of potential to be applied to the field winding of said booster generator, and means controlled by the displacement of the movable device for varying the relative lengths of the intervals of time that the two values of potential are applied to said booster generator.

13. In a system for controlling the tension on a strip of material, in combination, a pair of roll stands for working the material, a motor for driving each of said roll stands, a tension roller disposed between said roll stands, means for moving said roller to apply a transverse pressure on said material, a booster generator connected to affect the excitation of one of said driving motors, a continuously energized Wheatstone bridge, said booster generator having its field winding connected to be energized in accordance with the unbalance of said bridge, means for intermittently so varying certain of the resistances of said bridge as to alternately cause first one and then the other of two values of potential to be applied to the field winding of said booster generator, and means controlled by the displacement of said tensioning roller for varying the relative lengths of the intervals of time that the two values of potential are applied to said booster generator.

WILLARD G. COOK.